United States Patent [19]

Vornfett

[11] 4,390,782
[45] Jun. 28, 1983

[54] METHOD AND APPARATUS FOR MEASURING THE LIQUID LEVEL OF CONTAINERS

[75] Inventor: Karl-Ulrich Vornfett, Hamburg, Fed. Rep. of Germany

[73] Assignee: Justus Technik GmbH Industrie-Anlagen, Hamburg, Fed. Rep. of Germany

[21] Appl. No.: 207,615

[22] Filed: Nov. 17, 1980

[51] Int. Cl.³ ............................................. G01N 21/24
[52] U.S. Cl. .............................. 250/223 B; 250/357.1; 209/524
[58] Field of Search ............... 250/357, 223 B, 223 R; 356/240; 209/526

[56] References Cited

U.S. PATENT DOCUMENTS 4,221,961  9/1980  Peyton .............................. 250/223 B Primary Examiner—David C. Nelms
Assistant Examiner—Darwin R. Hostetter
Attorney, Agent, or Firm—Cushman, Darby & Cushman

[57] ABSTRACT

A method and apparatus for measuring the liquid level in each of a plurality of containers in which each bottle passes in succession on a conveyor belt past a measuring station and between a radiation source and detector at the station. Each bottle is detected as it reaches the station to trigger actuation of the radiation source for a given number of time periods. Each period is of fixed duration and the time between periods is varied in accordance with the speed of belt and container so that each container receives the same radiation regardless of its speed.

9 Claims, 2 Drawing Figures

METHOD AND APPARATUS FOR MEASURING THE LIQUID LEVEL OF CONTAINERS

The invention relates to a method and apparatus for measuring the liquid level of containers, particularly cans or bottles containing liquids moved along a measuring station on a conveyor belt running at a variable speed and where they are exposed to radiation, particularly radioactive radiation, the amount of radiation passing through the containers being measured.

Such methods for measuring the liquid level of containers are generally known and operate reliably and accurately if the conveyor belt conveying the containers is driven at a constant speed. In this case, the time during which the container is located in the measuring station is known, because this time is dependent on the one hand on the known constant conveyor belt speed and on the other, on the also known constant dimension of the container or the container part which is located in the range of the path of the rays. It is consequently easily possible to start and finish the measurement of the radiation which passes through the same point on a container in all cases, so that the measured results obtained are comparable and constitute a measure for the container liquid level. The amount of radiation received is greater if the radiation passes through an unfilled container area than if it passes through a filled container area.

In modern bottle and can filling plants, such as for the filling of beverages, e.g., soft drinks, every effort is made to operate at maximum conveying speeds in order to fill the maximum number of containers per unit of time. However, it is unavoidable in such plants that occasionally there are accumulations making it necessary to reduce the conveying speed. In addition, every effort is made to operate the plant with minimum noise levels, e.g., by preventing the conveyed bottles from striking against one another. As a result, the conveying speed of the plant is regulated in such a way that the bottles have a certain minimum spacing from one another and do not come into contact. Methods and apparatus for regulating the conveying speed are generally used and widely known.

However, if the individual containers are moved at different speeds through the measuring station for checking the liquid level, that is, if a constant measuring time is used as a basis for evaluating the radiation received, the known measuring method does not provide comparable results. This is because, for example, at a relatively high conveying speed the radiation measurement takes place over the entire container dimension in the conveying direction, while at a relatively low speed the radiation measurement only takes place over a smaller part of the container dimension in the conveying direction. It is obvious that such measurements are no longer comparable and particularly when using a relatively high belt speed as a basis for the measurement time the container moving through the measuring station at a very low speed can permit the passage of so much radiation that it is considered to be inadequately filled, although in fact it is completely filled.

The problem of the present invention is, therefore, to provide a method for measuring the liquid level of containers moving at a variable speed through a measuring station and which easily achieves comparable results.

According to the present invention, this problem is solved by improving the method of the aforementioned in such a way that the quantity of radiation is measured for a predetermined time, in a given number of time periods of fixed duration. The time between periods is varied in accordance with the speed of belt and container so that each container receives the same radiation regardless of speed.

Thus, in the method according to the present invention, as also in the known methods, a predetermined time interval is established for the measurement of each container. However, this time interval is subdivided into time periods of equal duration, and the latter, controlled in accordance with the conveyor belt speed, are so distributed over the containers passing through the measuring station that they always appear at the same point on the container, no matter whether the latter is moving rapidly or slowly through the measuring station. Thus, for each container the same spatial areas are evaluated, so that the results obtained for all the containers are immediately comparable, because measurements always take place over the same time interval and at the same points on the container, independently of the belt conveying speed.

The invention is explained in greater detail hereinafter with reference to the drawings in which.

Figure 1:
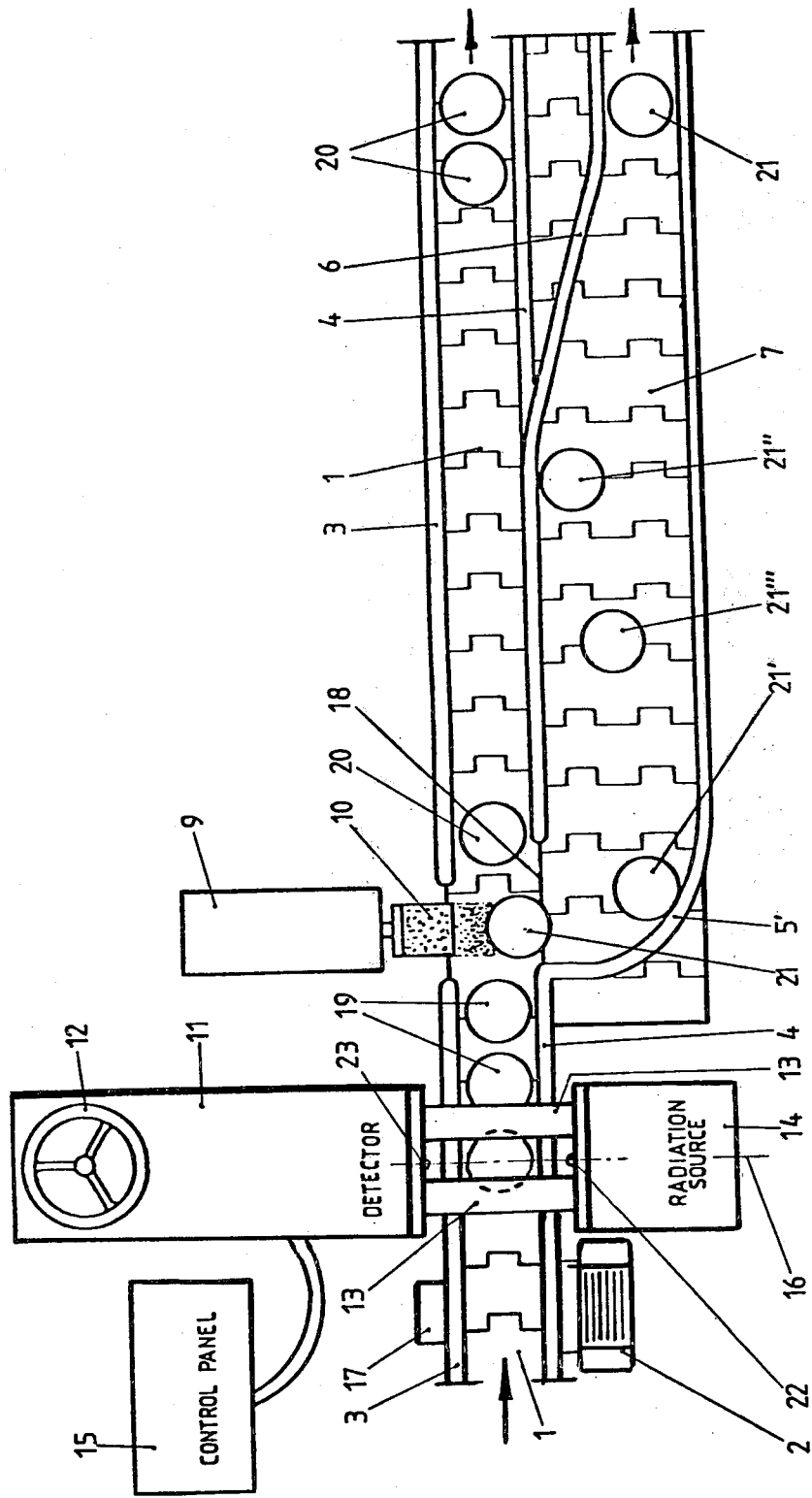
FIG. 1 is a diagrammatic, simplified plan view of a part of a conveyor system for filled cans with a measuring station for inspecting the liquid level thereof and a rejecting means for rejecting incorrectly filled cans.

The system shown in FIG. 1 comprises a conveyor belt 1, driven by a variable speed motor 2. In the present case, the conveyor belt comprises a chain conveyor made from stainless steel and is laterally bounded by stationary guide rails 3, 4, which keep the conveyed cans on the belt 1. The cans 19 successively pass through a measuring station including a detector 11, and a source 14 to be described hereinafter and then pass into the area of a rejecting means 9, whose rejector 10 can be moved through a gap in guide rail 3 in the area of conveyor belt 1 in order to remove faulty cans 21 from the latter through an opening 18 in guide rail 4 onto a further conveyor belt 7 running in parallel to belt 1, and which is constructed in the same way as the latter. Rejector 10 ejects the faulty cans 21 onto conveyor belt 7 in such a way that the greater their underfilling, the further they pass across the belt. Thus, for example, can 21' which has reached the curved guide rail 5' connecting the guide rail 4 to the outer guide rail 5 of conveyor belt 7 is greatly underfilled, while can 21'' moving along guide rail 4 is slightly underfilled, and the can 21''' located in the center of conveyor belt 7 has a degree of underfilling which is between that of 21' and 21''. These underfilled cans are then conveyed away from the conveyor belt 7 through the area between guide rail 5 and guide rail 6.

In such systems, the speed of conveyor belt 1 must frequently be adapted to the operating conditions, because unavoidable accumulations of containers constantly occur, so that the filling capacity must be reduced, and particularly because during the filling and transporting of bottles adjacent bottles must be prevented from banging against one another and producing a large amount of noise. This conveyor belt speed control is of a conventional nature and is brought about by the corresponding control of the speed of motor 2. Motor 2 drives a driving pulley (not shown) for conveyor belt 1 located on a shaft (not shown) and to the latter is also connected a conveyor speed detector 17 which produces a speed detector pulse, for example, for every millimeter of forward movement of belt 1. For this purpose the conveyor speed detector 17 can, for example, have a perforated disc fixed to the shaft and on whose one side is arranged in stationary manner a light source and on whose other side is arranged a receiver, so that the thus formed light barrier always emits a control pulse on passing through the perforations of the perforated disc. As a result, the time spacing of two successive control pulses is determined by the known distance between adjacent perforations of the perforated disc and by the running speed of conveyor belt 1.

The measuring station contains a radiation means 14 with a radiation source, which emits radioactive radiation (gamma radiation). This radiation passes through a small slot (not shown) located in line 16 and which faces the detector 11 facing the radiation means 14. Detector 11, which is fixed by means of struts 13 to radiation means 14 can be vertically adjusted by means of a handwheel 12 so as to bring the position of the slot of radiation means 14 and consequently the position of the path of the rays to the desired level with respect to the container to be inspected. Detector 11 is also connected to a control panel 15 containing the conventional switches (not shown) for the different operating states, together with the circuit arrangement to be described hereinafter. Detector 11 contains a conventional scintillation counter, by means of which the amount of radiation passing through the slot from the radiation source of radiation means 14 and entering detector 11 is determined.

There is also a conventional light barrier on line 16 and its diagrammatically indicated light source 22 can also be arranged in radiation means 14 and its diagrammatically indicated receiver 23 in detector 11. On interrupting its light beam it produces a trigger start pulse.

If the liquid level of a can or some other container is to be determined with the aid of the radiation means 14 and detector 11 the measurement must always take place over the same time interval and over the same area of a can in order to obtain comparable results for all the cans. However, due to the different running speeds of the belt this cannot be achieved by starting the measurement on interrupting the path of the beam of the light barrier between source 22 and receiver 23 and performing it for a predetermined time because, depending on the speed of belt 1, for certain cans the measurement would apply to their complete extension in the conveying direction and for others it would only apply to part of this extension, so that necessarily the results obtained would not be comparable. To avoid these difficulties the signals received or obtained in detector 11 are evaluated in a special way, e.g., as illustrated by the circuit arrangement of FIG. 2 located in a control panel and whose operation is described hereinafter in conjunction with the passage of a can. In this connection, it is pointed out that the abbreviation "IC" used in FIG. 2 relates to an integrated circuit and that the type of integrated circuit used in FIG. 2 is given under the "IC Number".

Figure 2:
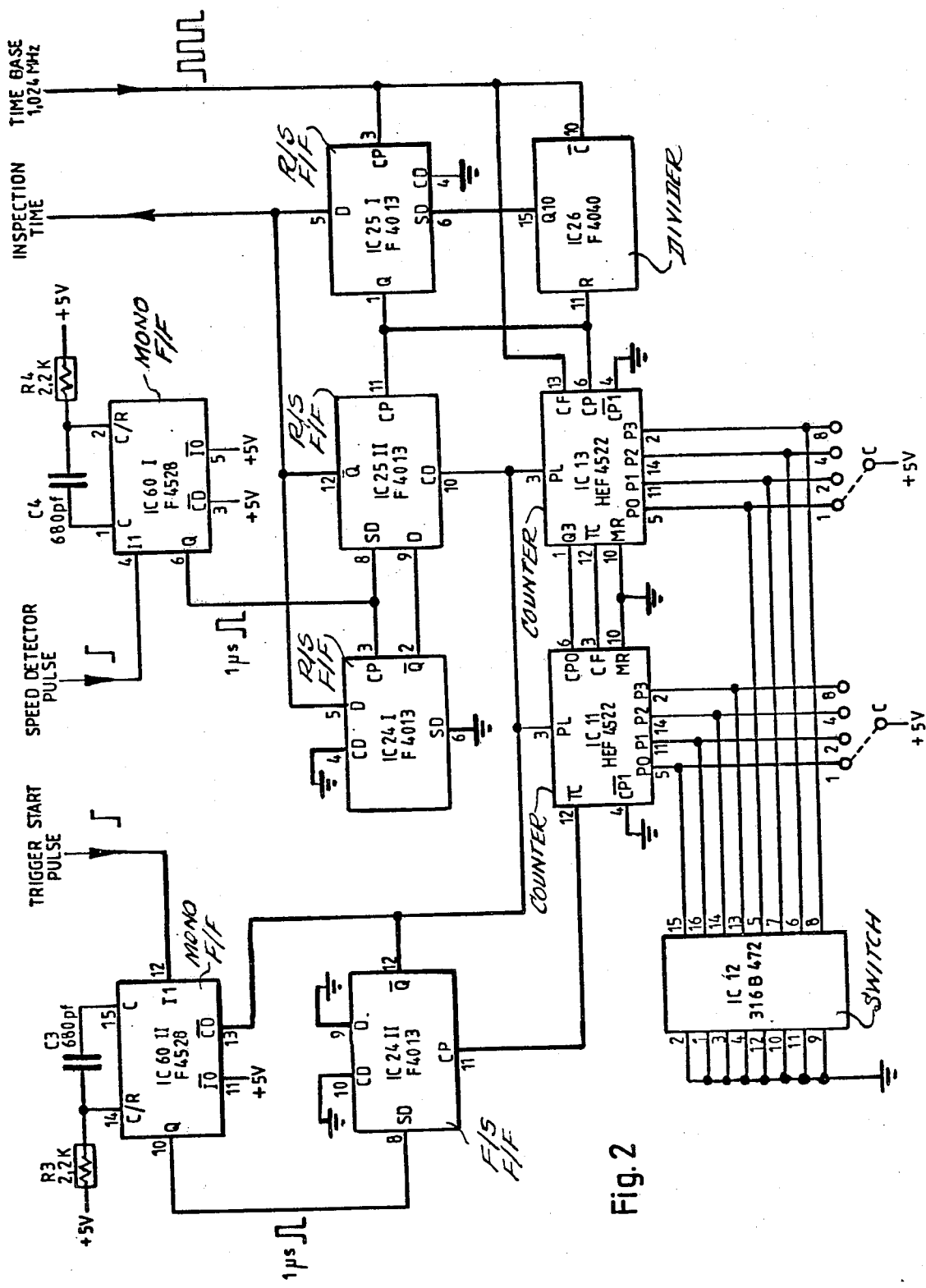
FIG. 2 shows a circuit arrangement for determining the quantity of radiation passing through a container in the measuring station during a predetermined time.

For the purpose of describing the operation of FIG. 2 the passage of a can conveyed on conveyor belt 1 through the space between detector 11 and radiation means 14 is used as a basis. When the front end of the can reaches line 16 (FIG. 1), it interrupts the light beam of light barrier 22, 23 which produces a trigger start pulse. The possitive leading edge of this trigger start pulse is supplied to input 12 of IC 60 II in FIG. 2, which is a monostable flip-flop. At its output 10 this circuit emits a shaped square-wave pulse with a length of one microsecond, the duration of this pulse being determined by the timing element comprising resistor R3 and capacitor C3. This pulse then reaches the setting input 8 of IC 24 II comprising an R-S flip-flop, whose terminals 9, and 10 are connected to ground. As a result of the input pulse IC 24 II supplies a pulse at its output 12 which on the one hand is applied to input 13 to block IC 60 II from producing and on the other hand is applied to free IC 25 II to form an R-S flip-flop by the signal on its input 10.

The control pulses from the conveyor speed detector 17 are continuously supplied to input 4 of IC 60 I which, in corresponding sequence at output 6 emits square-wave pulses lasting one micro-second, this time being determined by a timing element comprising resistor R4 and capacitor C4. The spacing between the leading edges of the 1 microsecond pulses is the same as the spacing of the leading edges of the control pulses generated by conveyor speed detector 17 and consequently the pulse separation indicates the speed of movement of the can to be inspected. The 1 microsecond pulses from output 6 to IC 60 I are fed to input 3 and input 8 of IC 24 I and IC 25 II forming R-S flip-flops.

A time base in the form of square-wave pulses with a frequency of 1.024 MHz is supplied to both input 3 of IC 25 I and input 10 of IC 26 which constitutes a divider. Together these two circuits form a time stage running for, for example, 1 millisecond following activation. This one millisecond period is fixed because divider IC 26 has a division ratio of 1:1024, so that after receiving 1024 pulses of the time base frequency of 1.024 MHz, i.e., after in each case 1 millisecond emits a pulse at output 15. This process begins when IC 25 II freed by IC 24 II receives a 1 microsecond pulse at input 8 and consequently provides the release for IC 25 I and IC 26 at output 12. The signal at output 12 of IC 25 II simultaneously serves to activate the scintillation counter for the radioactive radiation, which then counts for as long as the signal appears at output 12 of the IC 25 II.

As a result of the release at terminal 11 IC 26 starts to count 1024 pulses, that is, to determine the time of one millisecond and on reaching this its output 15 supplies a signal to the input 6 of IC 25 I which at its output 1 emits a resetting signal which is supplied to input 11 of IC 25 II and consequently switches away the signal at its output 12. Thus, the scintillation counter is made inactive after exactly one millisecond and is only activated again in the aforementioned manner when a further 1 microsecond pulse appears at input 8 of IC 25 II.

The resetting pulse at output 1 of IC 25 I also passes to the resetting input 11 of IC 26 and consequently resets the divider. This resetting pulse is also supplied to the input 6 of the first stage of a counting chain formed from settable down counters comprising IC 13 and IC 11. The time base is supplied in the form of a synchronizing signal to IC 13 via its input 13. Inputs 5, 11, 14, 2 of the counters of this counting chain which are binary coded decimal counters are, as shown, connected to adjustable, diagrammatically indicated switches in order to be able to preselect a count result. This counting chain is in a position to perform up to 99 counting stages. IC 12 which is connected to inputs 5, 11, 14, 2 of IC 11 and IC 13 constitutes a resistance network which connects to ground the counter terminals not subject to the action of the switches in order to provide clearly defined potentials for these terminals.

The counting chain formed by IC 13 and IC 11 counts one step downwards from the preset count result whenever a resetting pulse appears at the resetting input of IC 26 and, therefore, at input 6 of IC 13, i.e., it counts one step downward after each activation of the scintillation counter for a predetermined time of in this case 1 millisecond. On reaching the number of activation time intervals of the scintillation counter preset with the latter IC 11 emits a resetting pulse at output 12 which resets IC 24 II via its input 11. Thus, IC 25 II is made inactive by output 12 of IC 24 II, so that further control pulses from the conveyor speed detector 17 (FIG. 1) do not lead to a re-activation of the scintillation counter. This only takes place again when a further trigger start pulse is supplied to IC 60 II, i.e., when another can interrupts the path of the rays of light barrier consisting of source 22 and detector 23 (FIG. 1).

It can be gathered from the above description that when a can passes through the space between detector 11 and radiation means 14 the circuit arrangement according to FIG. 2 is "activated" by means of a trigger start pulse from the light barrier consisting of source 22, and detector 23. Thus, in the case of each control pulse from the conveyor speed detector 17, that is, for each path unit completed by the can, the circuit arrangement produces an actuating pulse for activating the scintillation counter at output 12 of IC 25 II. The duration of the actuating pulse is fixed at 1 millisecond by IC 25 I and IC 26 with the aid of the time base frequency of 1.024 MHz. After a predetermined number of actuating pulses the circuit arrangement is made "inactive" again by the time stage (IC 25I, IC 26). In this way the radioactive radiation from the radiation source of radiation means 14 is measured by the scintillation counter for a predetermined time interval for each can, independently of the conveying speed of belt 1, the time being determined by the predetermined length of the actuating pulses and their number. The individual actuating pulses always appear at the same point on the can, independently of the conveying speed, so that the measured results for all cans are comparable.

However, if the system according to FIG. 1 is incorrectly operated, conveyor belt 1 may operate so quickly that the time taken by the can to pass through the space between detector 11 and radiation means 14 is shorter than the predetermined time interval for evaluating the radiation from the radiation source, i.e., the time resulting from the product of the length of an actuating pulse and the number of actuating pulses per can. The aforementioned circuit arrangement would not then operate in the desired manner and would instead suppress individual actuating pulses.

In order to keep the circuit arrangement operational in this case and to obtain a measured result which is usable at least to a certain extent, IC 24 I constituting an R-S flip-flop is connected to inputs 8 and 9 of IC 25 II. Input 5 of IC 24 I receives from output 12 of IC 25 II the information that 1 millisecond actuating pulses are produced. The 1 microsecond pulses are supplied by IC 60 I to the input 3 of this circuit and if the intervals between the individual 1 microsecond pulses are shorter than the aforementioned time of 1 millisecond per actuating pulse, IC 24 I via its output 2 renders ineffective a suppression from IC 25 II. The radiation is then evaluated over the enter can transit which can obviously lead to false measurements, but generally provides a certain security until the speed of conveyor belt 1 has again dropped to a permitted value.

The count result indicated by the scintillation counter after checking a can is generally used for determining an underfilling thereof, i.e., if the scintillation counter gives a result which is above a predetermined value this means that the can is not adequately filled, i.e., too much radioactive radiation has passed through it. Following an advance time corresponding to the movement of the can from the area of detector 11 and radiation means 14 to rejection means 9, this count result actuates rejector 10 and the can is discharged onto conveyor belt 7.

It is pointed out that the invention not only makes it possible to detect the underfilling of containers, but also the overfilling thereof. For this purpose the slot of radiation means 14 is brought to a corresponding level and the scintillation counter is set to a value which is reached when the radioactive radiation passes through an empty container area. If the determined count level is lower it indicates that there is liquid in the container area which should be unfilled, i.e., the container is overfilled.

Many changes and modifications in the above-described embodiments, can, of course, be carried out without departing from the scope of the present invention. That scope is intended, therefore, to be limited only by the scope of the appended claims.

What is claimed is:

1. A method for measuring the liquid level in each of a number of containers comprising:
    moving said container on a conveyor belt one at a time past a measuring station having a radiation source and detector;
    detecting the speed of movement of said belt and producing a speed signal indicating that speed;
    passing radiation through each said container as said container passes through said station for a given number of time periods of fixed duration; and
    varying the time between said periods in accordance with said speed signal so that each container recreives substantially the same radiation regardless of its speed.

2. A method as in claim 1, wherein said steps of passing and varying include producing a signal actuating said source upon receipt of said speed signal, enabling actuation upon receipt of a signal indicating detection of a container at said station, dividing clock pulses and producing an output upon a given number of inputs, and counting the outputs and disabling said source upon a given count.

3. A method as in claim 1 or 2, including the further step of detecting each container as it reaches said source and triggering said passing upon said detecting.

4. A method as in claim 3, wherein said detecting of each container includes breaking a light beam between a light source and light detector at said station.

5. Apparatus for measuring the liquid level in each of a plurality of containers comprising:
    a measuring station including a source of radiation for producing, when actuated, radiation to pass through a container and means for detecting radiation from said source which has passed through said container;
    a conveyor belt for moving each said container successively past and between said source and radiation detecting means;

means for driving said belt at a variable speed;

means for detecting the speed of movement of said containers and belt and producing a speed signal indicating that speed;

control circuit means connected to said source, and said detecting and producing means for actuating said source for a given number of time periods of fixed duration and varying the time between said periods in accordance with said signal so that each container receives substantially the same radiation regardless of its speed.

6. Apparatus as in claim 5, wherein said control circuit means includes means for detecting each container as it reaches said source and producing a container detection signal for triggering said radiation source for said periods upon detecting said container.

7. Apparatus as in claim 6 wherein said detecting and triggering means includes a light source, a light detector positioned at said station so that each container breaks the light beam between said light source and light detector and means for producing an enabling pulse when said beam is broken.

8. Apparatus as in claim 6 or 7 wherein said control circuit means includes actuating means for producing, when enabled, a signal actuating said source upon receipt of said speed signal and means for enabling said actuating means upon receipt of said container detection signal, a divider circuit means for producing an output upon receipt of a given number of input clock pulses, when said actuating signal is produced, and counter means connected to said divider circuit means for counting the outputs from said divider circuit means and disabling said enabling means upon a given count.

9. Apparatus as in claim 8, wherein said enabling means and said actuating means each include a monostable flip-flop and an R/S flip-flop.

* * * * *